(12) United States Patent
Yu et al.

(10) Patent No.: US 12,535,564 B2
(45) Date of Patent: Jan. 27, 2026

(54) TIME OF FLIGHT MEASUREMENT METHOD AND APPARATUS

(71) Applicant: Huawei Technologies Co., Ltd., Guangdong (CN)

(72) Inventors: Kai Yu, Hangzhou (CN); Fengguang Qu, Dongguan (CN); Feng Yu, Hangzhou (CN); Shichuan He, Shenzhen (CN); Kewei Jiang, Tokyo (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 673 days.

(21) Appl. No.: 17/964,691

(22) Filed: Oct. 12, 2022

(65) Prior Publication Data
US 2023/0045083 A1   Feb. 9, 2023

Related U.S. Application Data

(63) Continuation of application No. PCT/CN2021/086690, filed on Apr. 12, 2021.

(30) Foreign Application Priority Data

Apr. 14, 2020 (CN) .......................... 202010291910.5

(51) Int. Cl.
*G01S 7/48* (2006.01)
*G01S 7/4865* (2020.01)
(Continued)

(52) U.S. Cl.
CPC .......... *G01S 7/4865* (2013.01); *G01S 7/4876* (2013.01); *G01S 17/14* (2020.01)

(58) Field of Classification Search
USPC ................................................. 356/4.01, 5.01
See application file for complete search history.

(56) References Cited

U.S. PATENT DOCUMENTS 10,209,349 B2    2/2019 Dussan et al.
10,317,529 B2 *  6/2019 Shu .......................... G01S 17/10
(Continued)

FOREIGN PATENT DOCUMENTS

CN    108897000 A    11/2018
CN    109613517 A     4/2019
(Continued)

OTHER PUBLICATIONS

English Translation of Written Opinion from the ISA for PCT/CN2021/086690 (Year: 2021).*
English Translation of CN 109752729 (Year: 2019).*

*Primary Examiner* — James R Hulka
(74) *Attorney, Agent, or Firm* — WOMBLE BOND DICKINSON (US) LLP

(57) ABSTRACT

A time of flight (TOF) measurement method and apparatus are provided, including a controller, a time to digital converter, a pulse transmitter, and a pulse receiver. The controller is configured to control, in a working period according to a predetermined transmit rule, the pulse transmitter to sequentially send M transmit pulses. The pulse receiver is configured to receive N feedback pulses in the working period. The time to digital converter is configured to obtain time of flight information corresponding to the N feedback pulses. The controller is further configured to obtain a target time of flight based on the time of flight information corresponding to the N feedback pulses, and obtain a target distance based on the target time of flight.

14 Claims, 5 Drawing Sheets

(51) Int. Cl.
*G01S 7/487* (2006.01)
*G01S 17/14* (2020.01)

(56) References Cited

U.S. PATENT DOCUMENTS

| | | | |
|---|---|---|---|
| 10,551,501 B1 | 2/2020 | Lachapelle | |
| 2018/0239001 A1* | 8/2018 | Dussan | G01S 7/4876 |
| 2018/0284229 A1* | 10/2018 | Liu | G01S 17/933 |
| 2018/0299552 A1 | 10/2018 | Shu et al. | |
| 2019/0086523 A1* | 3/2019 | Liem | G01S 17/10 |
| 2019/0170855 A1* | 6/2019 | Keller | G01S 7/2926 |
| 2020/0049821 A1* | 2/2020 | LaChapelle | G01S 17/42 |
| 2020/0217959 A1* | 7/2020 | Hall | G01S 17/02 |
| 2021/0096226 A1* | 4/2021 | Baek | G01S 7/484 |
| 2022/0206115 A1* | 6/2022 | Chawla | G01S 7/4865 |
| 2022/0308222 A1* | 9/2022 | Reddy | G01S 7/484 |
| 2023/0367019 A1* | 11/2023 | Kawahito | H04N 23/56 |

FOREIGN PATENT DOCUMENTS

| | | |
|---|---|---|
| CN | 109752729 A | 5/2019 |
| CN | 110095780 A | 8/2019 |
| CN | 110609293 A | 12/2019 |

\* cited by examiner

TIME OF FLIGHT MEASUREMENT METHOD AND APPARATUS

CROSS-REFERENCE TO RELATED APPLICATIONS

This application is a continuation of International Application No. PCT/CN2021/086690, filed on Apr. 12, 2021, which claims priority to Chinese Patent Application No. 202010291910.5, filed on Apr. 14, 2020, the disclosures of which are hereby incorporated by reference in their entirety.

TECHNICAL FIELD

This application relates to the field of electronic technologies, and in particular, to a time of flight (TOF) measurement method, a distance measurement method and apparatus, and an electronic device.

BACKGROUND

With the development of science and technology, computer vision is widely applied to people's daily life and various industries, for example, applied to fields such as geographic mapping imaging, remote sensing, automotive automated driving, autonomous vehicles, cooperative robots, three-dimensional depth of field measurement, and consumer electronics.

A radar (such as a laser radar, a millimeter wave radar, or a visible light radar) is an important technology for implementing computer vision, and is widely applied to various electronic devices. For example, a 3D depth camera is an application instance of a radar system, and the system includes a pulse transmitter, a pulse receiver, a time to digital converter (TDC), and a controller. The pulse transmitter is responsible for generating a pulse and transmitting the pulse to a tested environment. The pulse receiver converts a received photon into an electron. The controller controls the pulse transmitter to send the transmit pulse to the tested environment. After being reflected by an object, the transmit pulse is received by the pulse receiver. The time to digital converter is controlled, by using a "start" signal, to start timing, and controlled, by using an "end" signal, to stop timing. After time to digital conversion, the controller may obtain time of flight (TOF) of the pulse in the air, and may obtain a distance $D=c*t/2$ through calculation by using the time of flight. As shown in FIG. 1, c is a propagation speed of a pulse in the air, t is time of flight during which the pulse is transmitted and then reflected by an environment, and then arrives at a pulse receiver. The pulse is transmitted at a specific pulse repetition frequency (PRF), and a maximum measurement distance that can be supported is $D\_max=c/(2*PRF)$.

As shown in FIG. 2, when a plurality of 3D depth cameras are in a same environment and are all in a working state, because a transmit pulse signal sent by each 3D depth camera is not exclusive, when a 3D depth camera sends a transmit pulse signal, the transmit pulse signal is reflected by an object or directly propagates to another 3D depth camera. After receiving the transmit pulse signal, the another 3D depth camera cannot identify an original source of the pulse signal. Consequently, mutual interference may occur, as shown in FIG. 3.

In addition to the foregoing case of mutual interference between a plurality of 3D depth cameras, interference may also occur inside a single 3D depth camera. As shown in FIG. 4, when there are two targets: a distant target and a near target, and a distance of the distant high-reflectivity target is greater than a maximum measurement distance, namely, range, supported by a system, a latency of a returned signal exceeds a current pulse transmit period. Consequently, the signal falls within a next pulse transmit period or another transmit period to be used as a feedback pulse in the next pulse transmit period or the another transmit period, causing interference.

SUMMARY

This application discloses a time of flight (TOF) measurement method, a distance measurement method and apparatus, and an electronic device, to resolve a problem that interference occurs when distance measurement is performed.

According to a first aspect, an embodiment of this application provides a distance measurement apparatus, including a controller, a time to digital converter, a pulse transmitter, and a pulse receiver, where the controller is separately connected to the time to digital converter, the pulse transmitter, and the pulse receiver, and the pulse receiver is connected to the time to digital converter. The controller is configured to control, in a working period according to a predetermined transmit rule, the pulse transmitter to sequentially send M transmit pulses, where the transmit rule is specific to the distance measurement apparatus, and M is an integer greater than 1. The pulse receiver is configured to receive N feedback pulses in the working period, where N is an integer greater than 1. The time to digital converter is configured to obtain time of flight information corresponding to the N feedback pulses. The controller is further configured to: obtain a target time of flight based on the time of flight information corresponding to the N feedback pulses, and obtain a target distance based on the target time of flight. In this manner, the M transmit pulses are transmitted according to the transmit rule specific to the distance measurement apparatus (referred to as "the machine" below) (different from a transmit rule of another distance measurement apparatus). For the machine, time values obtained based on a plurality of reflected pulses obtained after transmit pulses of the machine are reflected by an object meet a normal distribution rule. However, because the transmit rule of the another distance measurement apparatus is different from the transmit rule of the machine, time values obtained by the machine based on a plurality of received interference pulses (for example, pulses obtained after transmit pulses transmitted by the another distance measurement apparatus are reflected by the object) are equivalent to random noise of the machine. For the machine, distribution of the time values generated based on these interference pulses is equivalent to random distribution, and does not affect normal distribution of the machine. In this way, interference from the another apparatus or inside the apparatus can be effectively eliminated, to obtain accurate time values by using correct normal distribution, thereby improving distance measurement reliability.

The working period may include M transmit periods, and that the controller is configured to sequentially send M transmit pulses in a working period according to a predetermined transmit rule specifically includes: the controller sequentially sends the M transmit pulses in the M transmit periods based on M transmit times, where a transmit time of an $i^{th}$ of the M transmit pulses is obtained based on a start moment of a transmit period of the $i^{th}$ of the M transmit pulses and an $i^{th}$ of M latencies. In this embodiment of this application, the distance measurement apparatus sends the M transmit pulses by using the M transmit periods, in other words, sends only one transmit pulse in one transmit period. In this solution, power consumption can be reduced.

Each of the M transmit pulses may be transmitted with a latency based on directly-generated random time.

In another embodiment, a transmit time of each of the M transmit pulses may be alternatively obtained based on a basic period and a random latency, where the basic period is greater than the random latency. In this way, each transmit time is equivalent to the basic period plus a random latency. For example, a basic period of the transmit pulse is 10 ns, the M latencies are m1, m2, m3, m4, . . . in sequence, and the M latencies each may be any positive number, negative number, zero, or the like. Correspondingly, the transmit times of the M transmit pulses are 0+m1 (may be alternatively 10+m1), 10+m2, 20+m3, 30+m4, . . . in sequence, that is, transmission is performed at m1 in the first transmit period, transmission is performed at 10+m2 in the second transmit period, transmission is performed at 20+m3 in the third transmit period, transmission is performed at 30+m4 in the fourth transmit period, and so on. In this embodiment, both the basic period and the random latency may be implemented by using hardware. For example, a basic period is generated by using a basic period generation circuit (this is very easy to implement); and then a random latency is generated by using a random latency generation circuit. In this case, the random latency (for example, 0 ns to 2 ns) does not need to be set to be too large, and therefore generation of the random latency is easier to be implemented by using hardware than generation of a larger random latency (for example, 8 ns to 12 ns), thereby reducing implementation costs.

The M latencies may be obtained at one time, that is, the M latencies are obtained before the transmit pulses are sent; or may be obtained at a plurality of times, for example, an $(i+1)^{th}$ latency is obtained when a transmit pulse is sent in an $i^{th}$ transmit period.

When the $i^{th}$ of the M transmit pulses is transmitted, time of flight information of the $i^{th}$ transmit pulse is a difference between a timing end moment of the time to digital converter and a timing start moment of the time to digital converter. The timing end moment of the time to digital converter is a moment at which the pulse receiver receives a feedback pulse in the transmit period of the $i^{th}$ transmit pulse; and the timing start moment of the time to digital converter corresponds to the transmit time of the $i^{th}$ transmit pulse; or the timing start moment of the time to digital converter corresponds to the start moment of the transmit period of the $i^{th}$ transmit pulse.

The time to digital converter may store all the obtained time of flight information, and then send all the obtained time of flight information to the controller; or when receiving any time of flight information, may directly send the time of flight information to the controller.

Further, when the timing start moment of the time to digital converter corresponds to the transmit time of the $i^{th}$ transmit pulse, time of flight of the N feedback pulses is the time of flight information corresponding to the N feedback pulses; or when the timing start moment of the time to digital converter corresponds to the start moment of the transmit period of the $i^{th}$ transmit pulse, time of flight of the N feedback pulses is obtained through latency compensation, where the apparatus further includes a latency compensator, the latency compensator is connected to the controller, and the latency compensator is configured to perform latency compensation on the time of flight information of the N feedback pulses based on the M latencies, to obtain the time of flight of the N feedback pulses.

The target time of flight is time of flight that appears for a largest quantity of times in the time of flight of the N feedback pulses. In this embodiment, the target time of flight is obtained based on statistical knowledge. The time of flight that appears for the largest quantity of times may indicate, in a relatively high probability, that the time of flight is the target time of flight. This manner is simple, direct, and relatively objective, thereby improving distance measurement reliability.

The apparatus further includes a memory, the memory is connected to the controller, and the memory is configured to store the time of flight of the N feedback pulses. The time of flight of the N feedback pulses is stored by using the memory, so that the controller can conveniently obtain the time of flight of the N feedback pulses, and obtain the target time of flight based on the time of flight information corresponding to the N feedback pulses.

The apparatus further includes a latency generator, the latency generator is connected to the controller, and the M latencies are obtained by the controller from the latency generator. The M latencies are generated by using the latency generator, and the M latencies are obtained through setting based on a true random number or a pseudo random number, or according to a preset rule, so that the controller controls transmit pulse sending based on the M latencies, thereby improving randomness of the transmit times corresponding to the transmit pulses, and further improving distance measurement reliability.

Alternatively, the M latencies are generated by the controller. The M latencies are generated by using the controller, and the M latencies are obtained through setting based on a true random number or a pseudo random number, or according to a preset rule, so that the controller controls transmit pulse sending based on the M latencies, thereby improving randomness of the transmit times corresponding to the transmit pulses, and further improving distance measurement reliability.

The M latencies may be generated by a hardware device, or may be generated by software.

According to a second aspect, this application provides a distance measurement method, including: an electronic device sequentially sends M transmit pulses in a working period according to a predetermined transmit rule, where the transmit rule is specific to the electronic device, and M is an integer greater than 1; the electronic device receives N feedback pulses in the working period, where N is an integer greater than 1; the electronic device obtains time of flight information corresponding to the N feedback pulses; and the electronic device obtains a target time of flight based on the time of flight information corresponding to the N feedback pulses, and obtains a target distance based on the target time of flight.

In an embodiment, the working period includes M transmit periods, and that an electronic device sequentially sends M transmit pulses in a working period according to a predetermined transmit rule specifically includes: the electronic device sequentially sends the M transmit pulses in the M transmit periods based on M transmit times, where a transmit time of an $i^{th}$ of the M transmit pulses is obtained based on a start moment of a transmit period of the $i^{th}$ of the M transmit pulses and an $i^{th}$ of M latencies.

When the $i^{th}$ of the M transmit pulses is transmitted, time of flight information of the $i^{th}$ transmit pulse is a difference between a timing end moment of a timer and a timing start moment of the timer. The timing end moment of the timer is a moment at which the electronic device receives a feedback pulse in the transmit period of the $i^{th}$ transmit pulse; and the timing start moment of the timer corresponds to the transmit time of the $i^{th}$ transmit pulse; or the timing start moment of the timer corresponds to the start moment of the transmit period of the $i^{th}$ transmit pulse.

Further, when the timing start moment of the timer corresponds to the transmit time of the $i^{th}$ transmit pulse, time of flight of the N feedback pulses is the time of flight information corresponding to the N feedback pulses; or when the timing start moment of the timer corresponds to the start moment of the transmit period of the $i^{th}$ transmit pulse, time of flight of the N feedback pulses is obtained through latency compensation.

The target time of flight is time of flight that appears for a largest quantity of times in the time of flight of the N feedback pulses.

The M latencies are obtained through setting based on a true random number or a pseudo random number, or according to a preset rule.

According to a third aspect, this application provides an electronic device, including a processor, a storage apparatus, and the distance measurement apparatus according to the first aspect and the various embodiments of the first aspect. The distance measurement apparatus is connected to the processor, and the processor is further connected to the storage apparatus. The storage apparatus is configured to store a computer program, the computer program includes program instructions, and the processor is configured to invoke the program instructions to execute various tasks. The distance measurement apparatus is configured to send a target distance obtained through measurement to the processor, and the processor is configured to perform corresponding processing on the received target distance.

For effects corresponding to the second aspect, the third aspect, and the implementations of the aspects provided in this application, refer to the beneficial effects corresponding to the first aspect and the various implementations of the first aspect. Details are not described herein again.

BRIEF DESCRIPTION OF DRAWINGS

The following describes the accompanying drawings used in embodiments of this application.

DESCRIPTION OF EMBODIMENTS

The following describes embodiments of this application with reference to the accompanying drawings in embodiments of this application. Terms used in embodiments of this application are merely used to explain specific embodiments of this application, but are not intended to limit this application.

The following describes embodiments of this application in detail.

Embodiment 1

Figure 5:
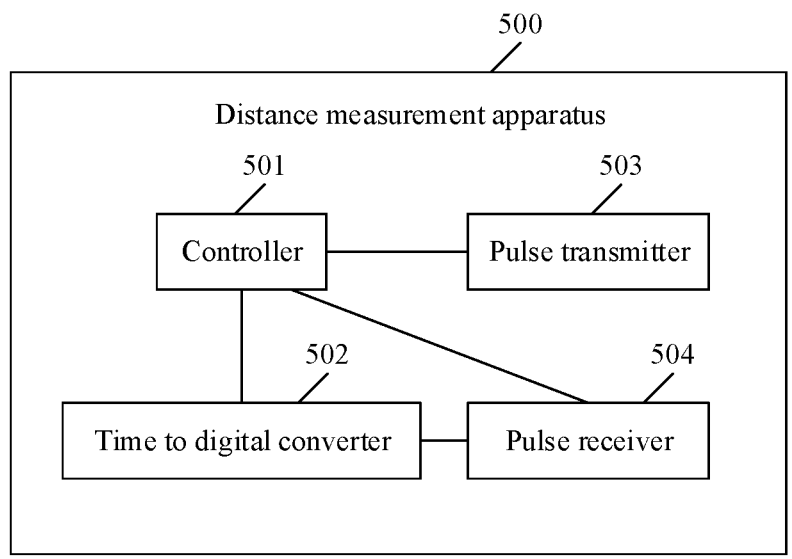
FIG. 5 is a schematic diagram of a distance measurement apparatus according to an embodiment of this application.

FIG. 5 is a schematic diagram of a distance measurement apparatus according to an embodiment of this application. The apparatus may be applied to a device such as a 3D depth camera or a mobile phone. As shown in FIG. 5, the apparatus 500 includes a controller 501, a time to digital converter (TDC) 502, a pulse transmitter 503, and a pulse receiver 504. The controller 501 is separately connected to the time to digital converter 502, the pulse transmitter 503, and the pulse receiver 504, and the pulse receiver 504 is connected to the time to digital converter 502.

The controller 501 is configured to control, in a working period according to a predetermined transmit rule, the pulse transmitter 503 to sequentially send M transmit pulses, where the transmit rule is specific to the distance measurement apparatus 500, and M is an integer greater than 1. In an embodiment, the working period is time for completing one time of measurement. To complete one time of measurement, a plurality of (for example, M, in this embodiment) transmit pulses may need to be transmitted to collect a plurality of pieces of time of flight information to obtain target time of flight. To achieve performance, M may be at least 500. A value of M is not limited in this application. In an embodiment, the transmit rule is a rule of transmitting the M transmit pulses, that is, specifies a time interval at which all the pulses are sent. In an embodiment, the transmit rule is specific to the distance measurement apparatus, that is, the distance measurement apparatus sequentially sends the M transmit pulses in a manner specific to the distance measurement apparatus, and the transmit rule is different from a transmit rule of another distance measurement apparatus with which the distance measurement apparatus works together. It may be understood that the "specific transmit rule" in this application is "specific" that can be implemented on an engineering basis, and does not represent absolute or 100% "specific". For example, a random number is generated to control an interval between all the transmit pulses, to distinguish the transmit rule as much as possible from a transmit rule of another distance measurement apparatus. In an embodiment, the transmit rule may be alternatively exactly the same as a transmit rule of another distance measurement apparatus. However, in this application, the transmit rule may still be considered as a "specific transmit rule" in this manner.

The pulse receiver 504 is configured to receive N feedback pulses in the working period, where N is an integer greater than 1. It may be understood that, after the transmit pulses are transmitted, some transmit pulses may be not reflected and therefore no feedback pulses are received for the transmit pulses. In addition, the pulse receiver 504 may further receive a feedback pulse of a transmit pulse transmitted by another working distance measurement apparatus. Therefore, the quantity N of actually received feedback pulses is not determined. Because there may be many transmit pulses, there may also be many received feedback pulses, in other words, N is greater than 1. The pulse receiver may be configured to work under control of the controller. For example, when measurement is required, the controller may control the pulse receiver to work; and after the measurement is completed, the controller may control the pulse receiver to stop working.

The time to digital converter 502 is configured to obtain time of flight information corresponding to the N feedback pulses. The time to digital converter 502 may obtain the time of flight information in the following manner: after receiving a feedback pulse, calculating time of flight information and storing the time of flight information in a corresponding memory. Alternatively, when receiving any time of flight information, the time to digital converter 502 may send the time of flight information to the controller 501. A specific form is not limited herein.

The controller 501 is further configured to: obtain target time of flight based on the time of flight information corresponding to the N feedback pulses, and obtain a target distance based on the target time of flight. In this embodiment of this application, the M transmit pulses are transmitted according to the transmit rule specific to the distance measurement apparatus (referred to as "the machine" below) (different from a transmit rule of another distance measurement apparatus). For the machine, time values obtained based on a plurality of reflected pulses obtained after transmit pulses of the machine are reflected by an object meet a normal distribution rule. However, because the transmit rule of the another distance measurement apparatus is different from the transmit rule of the machine, time values obtained by the machine based on a plurality of received interference pulses (for example, pulses obtained after transmit pulses transmitted by the another distance measurement apparatus are reflected by the object) are equivalent to random noise of the machine. For the machine, distribution of the time values generated based on these interference pulses is equivalent to random distribution, and does not affect normal distribution of the machine. In this way, interference from the another apparatus or inside the apparatus can be effectively eliminated, to obtain accurate time values by using correct normal distribution, thereby improving distance measurement reliability.

Embodiment 2

Based on Embodiment 1, a method for transmitting the transmit pulses is described in detail in this embodiment. In this embodiment, the working period includes M transmit periods. The transmit period is an interval between a transmit time of a transmit pulse and a transmit time of a next transmit pulse (for a non-last transmit pulse in the working period), or an interval between a transmit time of a transmit pulse and an end time of the working period (for the last transmit pulse in the working period). When being configured to control, in the working period according to the predetermined transmit rule, the pulse transmitter to sequentially send the M transmit pulses, the controller is configured to control the pulse transmitter to sequentially send the M transmit pulses in the M transmit periods based on M transmit times. A transmit time of an $i^{th}$ of the M transmit pulses is obtained based on a start moment of a transmit period of the $i^{th}$ of the M transmit pulses and an $i^{th}$ of M latencies. The $i^{th}$ transmit pulse herein is one of the M transmit pulses.

That is, in this solution, the M transmit pulses are sent by using the M transmit periods, in other words, only one transmit pulse is sent in each transmit period. Compared with an existing manner in which a plurality of pulses are transmitted in one transmit period, power consumption can be effectively reduced in this solution.

Each of the M transmit pulses may be transmitted with a latency based on directly-generated random time.

In another implementation, a transmit time of each of the M transmit pulses may be alternatively obtained based on a basic period and a random latency, where the basic period is greater than the random latency. In this way, each transmit time is equivalent to the basic period plus a random latency. For example, a basic period of the transmit pulse is 10 ns, the M latencies are m1, m2, m3, m4, . . . in sequence, and the M latencies each may be any positive number, negative number, zero, or the like. Correspondingly, the transmit times of the M transmit pulses are 0+m1 (may be alternatively 10+m1), 10+m2, 20+m3, 30+m4, . . . in sequence, that is, transmission is performed at m1 in the first transmit period, transmission is performed at 10+m2 in the second transmit period, transmission is performed at 20+m3 in the third transmit period, transmission is performed at 30+m4 in the fourth transmit period, and so on. In this implementation, both the basic period and the random latency may be implemented by using hardware. For example, a basic period is generated by using a basic period generation circuit (this is very easy to implement); and then a random latency is generated by using a random latency generation circuit. In this case, the random latency (for example, 0 ns to 2 ns) does not need to be set to be too large, and therefore generation of the random latency is easier to be implemented by using hardware than generation of a larger random latency (for example, 8 ns to 12 ns), thereby reducing implementation costs.

The M latencies are obtained through setting based on a true random number or a pseudo random number, or according to a preset rule. Generation of the true random number may rely on a hardware device. For example, the hardware device may be a separate chip, or may be encapsulated in a same chip as the controller. For example, the true random number may be a random number whose generation relies on a physical random number generator. Generation of the true random number may alternatively rely on software. The software may share one piece of hardware (for example, a processing chip) with the controller, and the true random number is generated in a software manner. The pseudo random number is a random number that is generated through simulation according to a specific algorithm and whose result is determined and visible. The preset rule may be any rule. For example, setting is performed based on any set values, for example, 1, 2, 1, 1, 3, 2, and 1.

The latencies may be generated by the controller 501. For example, generation of the latencies may rely on software. The software may share one piece of hardware (for example, a processing chip) with the controller, and then the latencies are generated in a software manner. Alternatively, the apparatus 500 further includes a latency generator, the latency generator is connected to the controller 501, and the M latencies are obtained by the controller 501 from the latency generator. The latency generator may be a separate chip, or may be encapsulated in a same chip as the controller.

Embodiment 3

Based on the foregoing embodiments, this embodiment describes a manner of obtaining the time of flight information and the target time of flight.

In a first embodiment, when the $i^{th}$ of the M transmit pulses is transmitted, time of flight information of the $i^{th}$ transmit pulse is a difference between a timing end moment of the time to digital converter 502 and a timing start moment of the time to digital converter 502.

The timing end moment of the time to digital converter 502 is a moment at which the pulse receiver 504 receives a feedback pulse in the transmit period of the $i^{th}$ transmit pulse; and the timing start moment of the time to digital converter 502 corresponds to the transmit time of the $i^{th}$ transmit pulse.

That is, in this embodiment, timing starts a pulse transmit moment, and the timing stops at a pulse receive moment. The time of flight information corresponds to the difference between the timing end moment of the time to digital converter 502 and the timing start moment of the time to digital converter 502. In this case, the time of flight information corresponds to time of flight of the transmit pulse.

That is, for example, a basic period of the transmit pulse is 10 ns, and the M latencies are m1, m2, m3, m4, . . . in sequence. In this case, the transmit times of the M transmit pulses are 0+m1, 10+m2, 20+m3, 30+m4, . . . in sequence, that is, transmission is performed at m1 in the first transmit period, transmission is performed at 10+m2 in the second transmit period, transmission is performed at 20+m3 in the third transmit period, transmission is performed at 30+m4 in the fourth transmit period, . . . . In this case, timing start moments of the time to digital converter 502 are m1, 10+m2, 20+m3, 30+m4, . . . .

In an embodiment, when the apparatus performs distance measurement, the controller first obtains the M latencies from the latency generator, or the controller generates the M latencies. Then, the controller sequentially sends the M transmit pulses based on preset transmit periods and the M latencies. For the M latencies, the controller may alternatively obtain an $(i+1)^{th}$ transmit latency when transmitting the $i^{th}$ transmit pulse in an $i^{th}$ transmit period. A specific form is not limited herein.

When the controller controls the pulse transmitter 503 to send the first transmit pulse, the controller controls the time to digital converter 502 to start timing. In the first transmit period, the pulse receiver 504 receives a feedback pulse. In the transmit period, the pulse receiver 504 may receive one feedback pulse, may receive at least two feedback pulses, or may receive zero feedback pulses in a special case. When the pulse receiver 504 receives a feedback pulse, the time to digital converter 502 is controlled to send a timing result in this case to the controller. When the pulse receiver 504 receives another feedback pulse, the time to digital converter 502 is controlled to also send a timing result in this case to the controller. By analogy, until the transmit period ends, the controller 501 triggers the time to digital converter 502 to stop timing. Alternatively, the time to digital converter 502 may first store moments at which the feedback pulses are received, and then send the moments to the controller 501 together, or the controller reads the time to digital converter 502 to obtain timing results. A specific form is not limited herein.

Then, in the second transmit period, when the controller triggers the pulse transmitter 503 to send the second transmit pulse, the controller triggers the time to digital converter 502 to start timing again. The foregoing operations are repeated until the apparatus completes sending of the M transmit pulses, and completes receiving of the feedback pulses in the M transmit periods. Then, the controller obtains the target time of flight based on a plurality of obtained timing results (time of flight of the pulses).

Time of flight that appears for a largest quantity of times in the time of flight of the N feedback pulses, namely, the target time of flight, may be obtained. Then, the target distance may be obtained based on a speed of flight (a speed of light).

Figure 8:
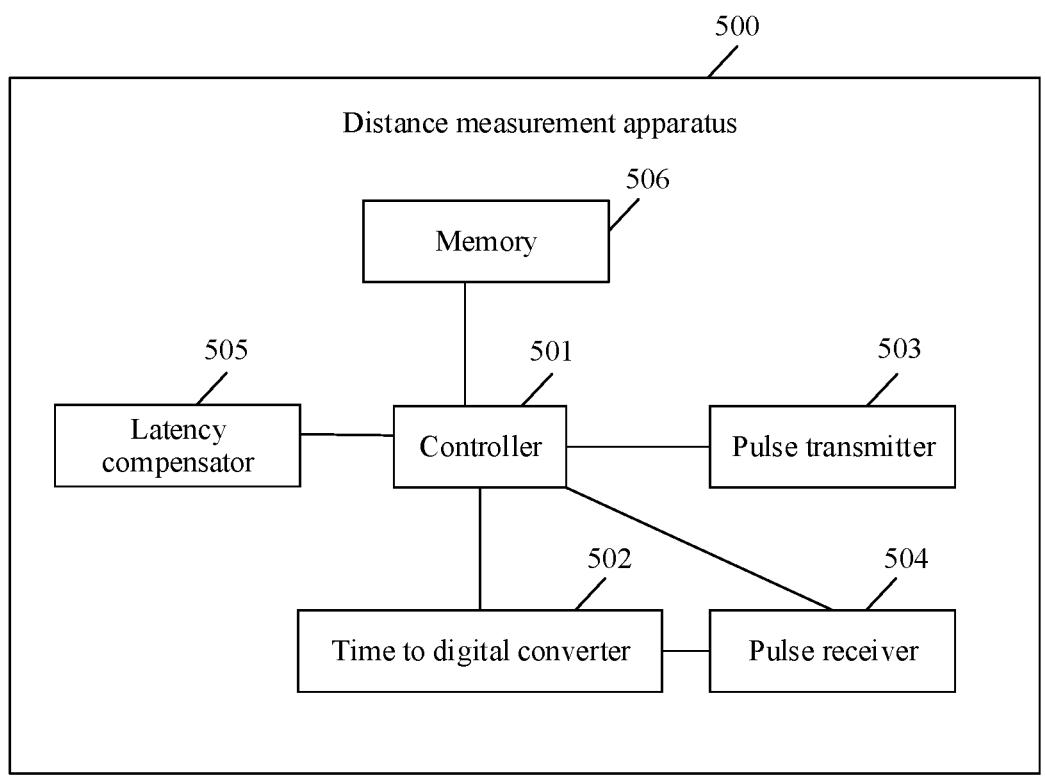
FIG. 8 is a schematic diagram of another distance measurement apparatus according to an embodiment of this application.

In an embodiment, the apparatus 500 may further include a memory 506. As shown in FIG. 8, the memory 506 is connected to the controller 501, and the memory 506 is configured to store the time of flight of the N feedback pulses. When the timing results (time of flight of the pluses) are obtained, the timing results may be written into the memory 506.

Figure 6:
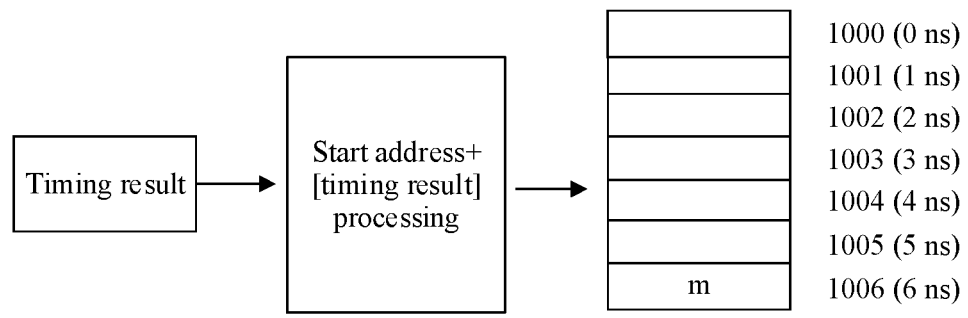
FIG. 6 is a schematic diagram of timing result storage according to an embodiment of this application.

In an embodiment, as shown in FIG. 6, a timing result of the time to digital converter 502 is used as an addressing basis, and each time the controller 501 obtains a timing result, the controller performs address mapping on the timing result to obtain an address of a corresponding storage unit in the memory, and then the controller increases a time count stored in the corresponding storage unit by 1. The address mapping is processing the timing result to obtain the address of the storage unit corresponding to the timing result, and may include a plurality of implementations. For example, a mapping method may be "start address+[timing result]", where [timing result] means normalizing (for example, rounding or truncating) a timing result to obtain a value, and "start address+[timing result]" means adding a predetermined start address to the value obtained based on [timing result], to obtain a final address.

Figure 7:
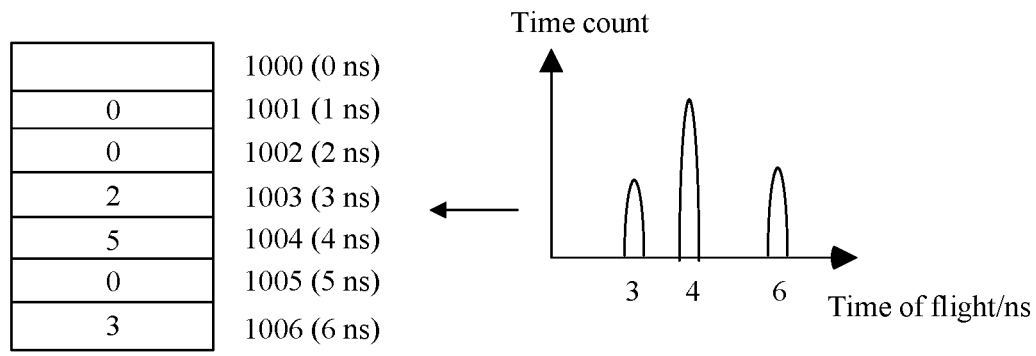
FIG. 7 is a schematic diagram of timing result processing according to an embodiment of this application.

As shown in FIG. 6, in a specific example, the memory includes seven storage units, each storage unit corresponds to a different address, and each address corresponds to a different time. Referring to FIG. 6, the storage units are 1000 (0 ns), 1001 (1 ns), 1002 (2 ns), 1003 (3 ns), 1004 (4 ns), 1005 (5 ns), and 1006 (6 ns) in sequence, where parentheses indicate times corresponding to addresses, that is, used to perform count accumulation on the addresses when the times are detected. For example, when a timing result obtained by the time to digital converter 502 is 6.6 ns, the timing result may be truncated to obtain 6, then rounding is performed to obtain 6, and then a start address, for example, 1000, is added to obtain a final corresponding address 1006. If a time count corresponding to the current address 1006 is m, the time count of the current address 1006 is updated to m+1. Time of flight that appears for a largest quantity of times in the time of flight of the N feedback pulses, namely, the target time of flight, is obtained. As shown in FIG. 7, a histogram corresponding to time of flight and a time count is obtained based on the foregoing stored results by using statistical knowledge. When there is multi-apparatus interference, time of flight that is of feedback pulses and that is obtained through measurement may be different, and therefore there may be a plurality of peaks. The time of flight 4 ns corresponds to 5 times, and is the time of flight that appears for the largest quantity of times. Therefore, 4 ns is the target time of flight. Then, the target distance may be obtained based on a speed of flight.

The feedback pulse in this embodiment of this application may be at least one of the following cases:

(1) a pulse that is in a same period and that is transmitted from the apparatus and reflected from a target;

(2) a pulse that is in one or several previous periods and that is transmitted from the apparatus and reflected from a target; and (3) a pulse transmitted from another apparatus.

Figure 1:
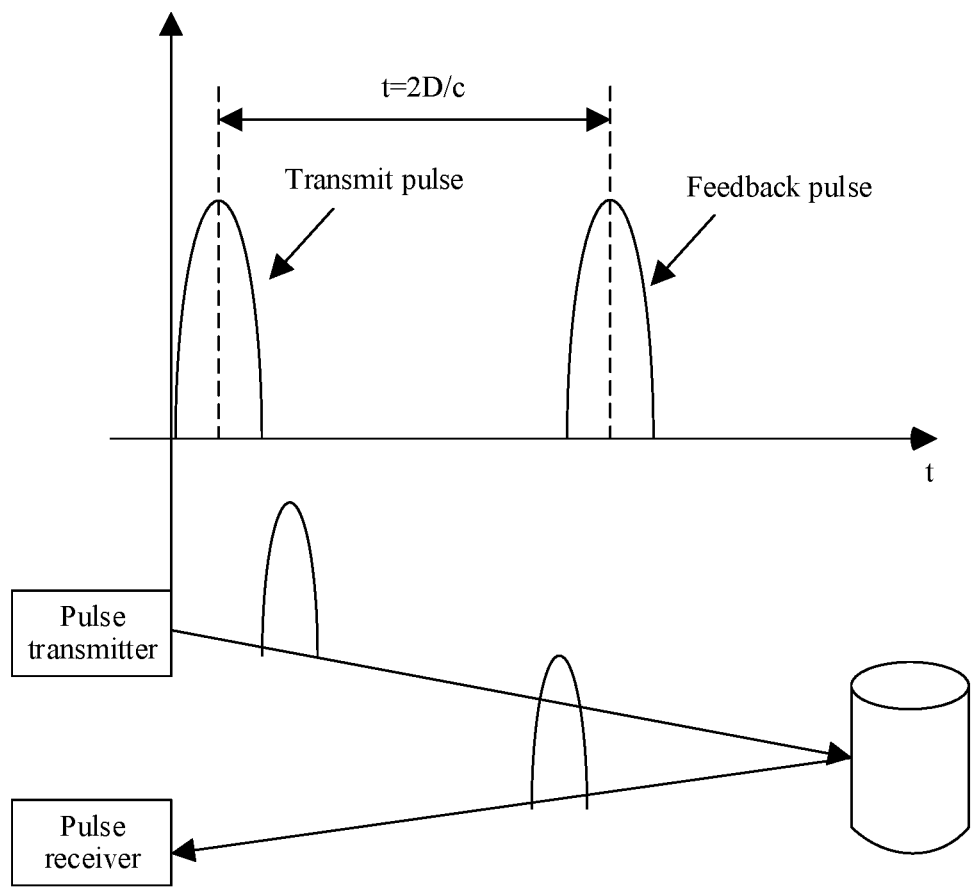
FIG. 1 is a schematic diagram of a conventional distance measurement technology.
Figure 2:
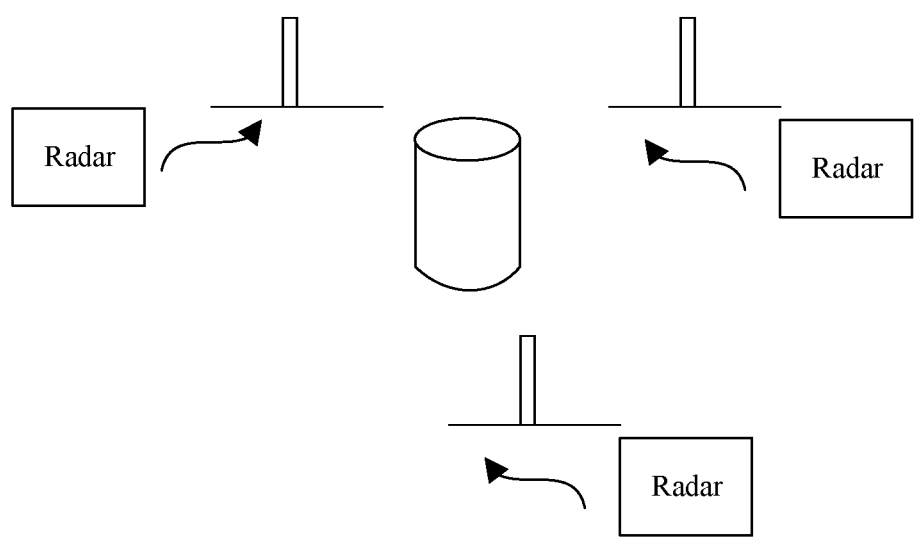
FIG. 2 is a schematic diagram in which mutual interference occurs when a plurality of devices perform the conventional distance measurement technology.
Figure 3:
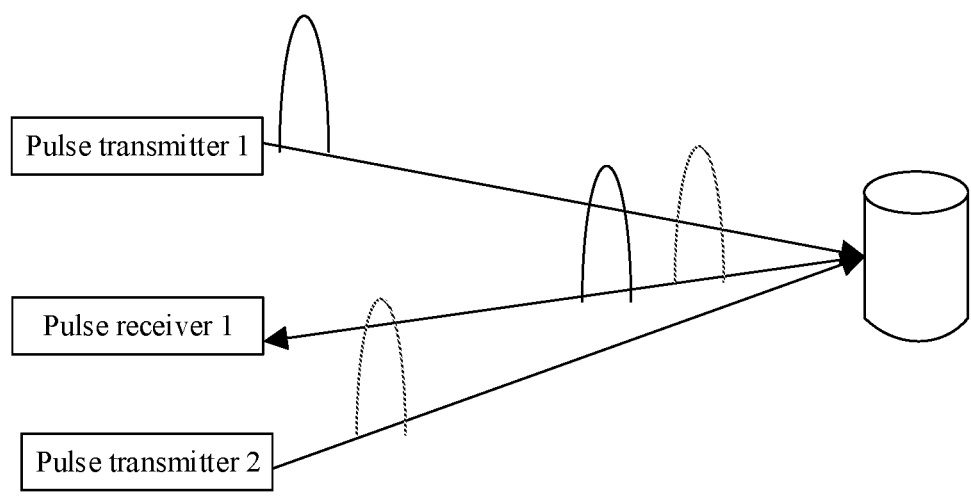
FIG. 3 is another schematic diagram in which mutual interference occurs when a plurality of devices perform the conventional distance measurement technology.
Figure 4:
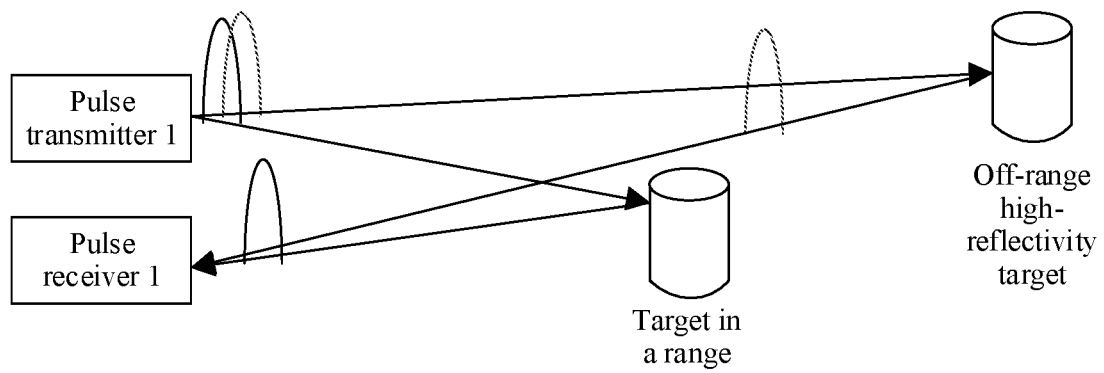
FIG. 4 is a schematic diagram in which interference occurs in a device when the device performs the conventional distance measurement technology.

A pulse that is in a previous period and that is transmitted from the apparatus and reflected from the target in (2) indicates the following: As shown in FIG. 4, when there are two targets: a distant target and a near target, and a distance between the distant high-reflectivity target and the apparatus is greater than a maximum measurement distance supported by the apparatus, because a latency of returning a signal by the distant target is greater than a pulse transmit period, the signal falls within one or several next transmit periods, and a corresponding distance is a measurement distance minus a range dmax. Time of flight of a transmit pulse of each apparatus is basically determined, and a pulse transmit moment is randomly changed. Therefore, a time at which an off-range signal in a current period is received in one or several next periods is random, and randomly distributed at a latency-related location. A real main peak in the range can be found by checking a location of a peak value.

Embodiment 4

Based on the foregoing embodiments, this embodiment describes another manner of obtaining the time of flight information and the target time of flight. In another embodiment, when the $i^{th}$ of the M transmit pulses is transmitted, time of flight information of the $i^{th}$ transmit pulse is a difference between a timing end moment of the time to digital converter 502 and a timing start moment of the time to digital converter 502. The timing end moment of the time to digital converter 502 is a moment at which the pulse receiver 504 receives a feedback pulse in the transmit period of the $i^{th}$ transmit pulse; and the timing start moment of the time to digital converter 502 corresponds to the start moment of the transmit period of the $i^{th}$ transmit pulse.

That is, different from Embodiment 3, in this embodiment, timing starts at the start moment of the transmit period of the transmit pulse.

That is, for example, a basic period of the transmit pulse is 10 ns, and the M latencies are m1, m2, m3, m4, . . . in sequence. The transmit times of the M transmit pulses are 0+m1, 10+m2, 20+m3, 30+m4, . . . in sequence, that is, transmission is performed at m1 in the first transmit period, transmission is performed at 10+m2 in the second transmit period, transmission is performed at 20+m3 in the third transmit period, transmission is performed at 30+m4 in the fourth transmit period, . . . . The controller controls timing start moments of the time to digital converter 502 to be 0 ns, 10 ns, 20 ns, 30 ns, . . . , that is, a timing start moment of the time to digital converter 502 in each transmit period is earlier than a transmit time of a transmit pulse in the corresponding transmit period.

It can be learned from Embodiment 3 that, the time of flight information corresponds to the difference between the timing end moment of the time to digital converter 502 and the timing start moment of the time to digital converter 502. In this embodiment, the timing start moment of the time to digital converter 502 is earlier than the transmit time of the transmit pulse, and therefore the time of flight information does not correspond to time of flight of a feedback pulse. Latency compensation needs to be performed on the time of flight information to obtain the time of flight of the corresponding feedback pulse. In an embodiment, referring to FIG. 8, the apparatus 500 further includes a latency compensator 505, the latency compensator 505 is connected to the controller 501, and the latency compensator 505 is configured to perform latency compensation on the time of flight information of the N feedback pulses based on the M latencies, to obtain the time of flight of the N feedback pulses.

The latency compensation is performed based on the latencies of the transmit periods. That is, time of flight of a feedback pulse received in the $i^{th}$ transmit period is a difference between time of flight information corresponding to the feedback pulse and a latency corresponding to the transmit period. If the first feedback pulse is received in the $i^{th}$ transmit period, time of flight of the first feedback pulse is obtained by subtracting a latency, namely, the $i^{th}$ latency, corresponding to the $i^{th}$ transmit period from time of flight information of the first feedback pulse.

In an embodiment, when the apparatus performs distance measurement, at a start moment of the first transmit period, the controller 501 controls the time to digital converter 502 to start timing. When the timing reaches the first latency, the controller controls the pulse transmitter 503 to send the first transmit pulse. In the transmit period, the pulse receiver 504 receives a feedback pulse. When the pulse receiver 504 receives a feedback pulse, the time to digital converter 502 is controlled to send a timing result in this case to the controller 501. When the pulse receiver 504 receives another feedback pulse in the transmit period, the time to digital converter 502 is controlled to also send a timing result in this case to the controller 501. By analogy, until the transmit period ends, the controller 501 controls the time to digital converter 502 to stop timing. The time to digital converter 502 may alternatively send moments at which the feedback pulses are received to the controller 501 together.

When receiving the timing result sent by the time to digital converter 502, the controller 501 may perform latency compensation on the timing result based on a corresponding latency, to obtain time of flight corresponding to the feedback pulse, where the time of flight is a timing result obtained after the compensation. In an embodiment, the time of flight corresponding to the feedback pulse is obtained by subtracting the latency corresponding to the transmit period from the timing result.

Alternatively, the latency compensation may be performed by the latency compensator 505, and the latency compensator 505 is connected to the controller 501. The latency compensator 505 may obtain the corresponding latency and the timing result from the controller 501, and then send the timing result obtained after the latency compensation to the controller 501.

Then, at a start moment of the second transmit period, the controller 501 controls the time to digital converter 502 to start timing again. When the timing reaches the second latency, the controller 501 controls the pulse transmitter 503 to send the second transmit pulse. The foregoing operations are repeated until the apparatus completes sending of the M transmit pulses, and completes receiving of the feedback pulses in the M transmit periods. Then, the controller 501 obtains the target time of flight based on a plurality of obtained timing results (time of flight of the pulses).

Embodiment 5

Figure 9:
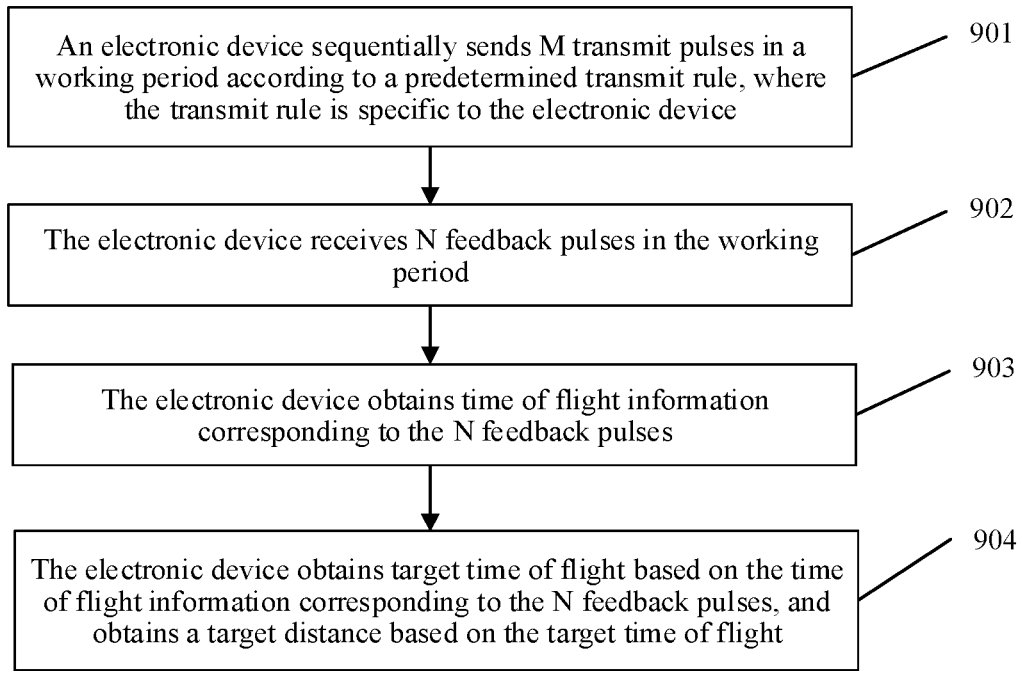
FIG. 9 is a schematic flowchart of a distance measurement method according to an embodiment of this application.

Based on the foregoing embodiments, referring to FIG. 9, this embodiment provides a distance measurement method. For a specific implementation process of the distance measurement method, refer to the specific descriptions of the distance measurement apparatus in FIG. 5 and the related descriptions of Embodiment 1 to Embodiment 4. The method may include operations 901 to 904. These operations are performed by an electronic device including the distance measurement apparatus in the foregoing embodiments. It may be understood that, in an embodiment, the operations may be completed based on the specific component modules for implementing the distance measurement apparatus in the foregoing embodiments. For example, in operation 901, a pulse transmitter may be controlled, by using a controller, to send M transmit pulses. This is not further described in this application. A person skilled in the art may know, with reference to the foregoing embodiments, how to enable the electronic device to complete the operations.

Operations 901 to 904 are as follows:

901: The electronic device sequentially sends the M transmit pulses in a working period according to a predetermined transmit rule, where the transmit rule is specific to the electronic device, and M is an integer greater than 1.

The working period may include M transmit periods, and the electronic device may sequentially send the M transmit pulses in the M transmit periods based on M transmit times. A transmit time of an $i^{th}$ of the M transmit pulses is obtained based on a start moment of a transmit period of the $i^{th}$ of the M transmit pulses and an $i^{th}$ of M latencies. For a specific manner in which the electronic device sequentially sends the M transmit pulses according to the predetermined transmit rule, refer to the descriptions in the foregoing embodiments. Details are not described herein again.

902: The electronic device receives N feedback pulses in the working period, where N is an integer greater than 1.

The electronic device sequentially sends the M transmit pulses in the working period, and receives the N feedback pulses in the working period. N may be greater than M, or may be less than M or equal to M. That is, it is possible that one feedback pulse is received or at least two feedback pulses are received in some transmit periods, no feedback pulse is received in some transmit periods, or the like.

903: The electronic device obtains time of flight information corresponding to the N feedback pulses.

When the $i^{th}$ of the M transmit pulses is transmitted, time of flight information of the $i^{th}$ transmit pulse is a difference between a timing end moment of a timer and a timing start moment of the timer.

The timing end moment of the timer is a moment at which the electronic device receives a feedback pulse in the transmit period of the $i^{th}$ transmit pulse; and the timing start moment of the timer corresponds to the transmit time of the $i^{th}$ transmit pulse. That is, the timer starts timing when the transmit time of the transmit pulse is reached for transmission. For details, refer to the descriptions in Embodiment 3. Details are not described herein again.

Alternatively, the timing end moment of the timer is a moment at which the electronic device receives a feedback pulse in the transmit period of the $i^{th}$ transmit pulse; and the timing start moment of the timer corresponds to the start moment of the transmit period of the $i^{th}$ transmit pulse. That is, the timer starts timing at a start moment of a transmit period of each transmit pulse. For details, refer to the descriptions in Embodiment 4. Details are not described herein again.

904: The electronic device obtains target time of flight based on the time of flight information corresponding to the N feedback pulses, and obtains a target distance based on the target time of flight.

In a first implementation, for the case in which the timing start moment of the timer corresponds to the transmit time of the $i^{th}$ transmit pulse, that is, the timer starts timing when the transmit time of the transmit pulse is reached for transmission, time of flight information of a feedback pulse is time of flight of the feedback pulse. For details, refer to the descriptions in Embodiment 3. Details are not described herein again. In this case, the target time of flight may be directly obtained based on the time of flight information corresponding to the N feedback pulses.

In a second implementation, for the case in which the timing start moment of the timer corresponds to a start moment of each transmit period, because the timing start moment is earlier than the transmit time of the transmit pulse in the time of flight information of the transmit pulse, the time of flight information does not correspond to time of flight of the transmit pulse. Therefore, latency compensation needs to be performed on the time of flight information to obtain time of flight of a feedback pulse. For details, refer to the descriptions in Embodiment 4. Details are not described herein again. Time of flight corresponding to the N feedback pulses is obtained based on the time of flight information corresponding to the N feedback pulses, and then the target time of flight is obtained based on the time of flight corresponding to the N feedback pulses.

Embodiment 6

Figure 10:
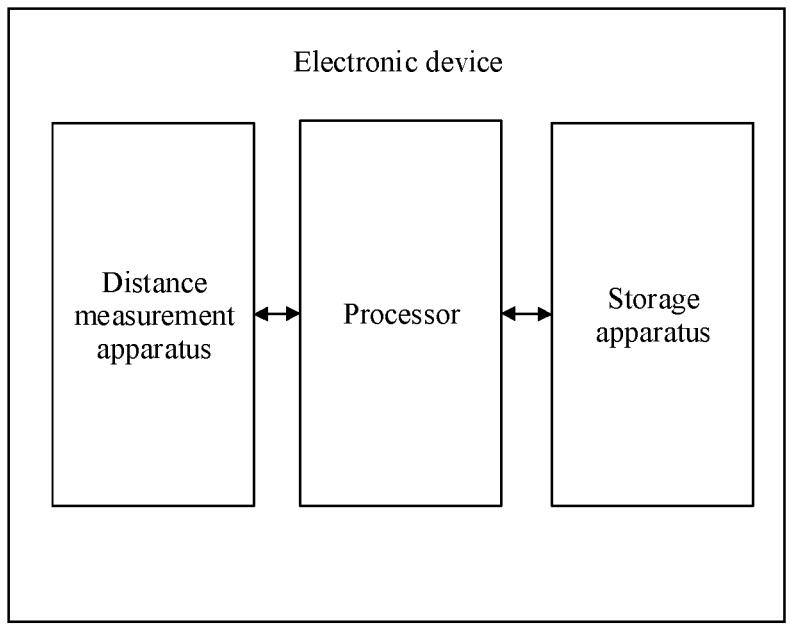
FIG. 10 is a schematic diagram of a structure of an electronic device according to an embodiment of this application.

Based on the foregoing embodiments, an embodiment of this application further provides an electronic device (may be, for example, a mobile phone, a tablet computer, or an unmanned aerial vehicle). As shown in FIG. 10, the electronic device includes a distance measurement apparatus, a processor, and a storage apparatus. The distance measurement apparatus is connected to the processor, and the processor is further configured to be connected to the storage apparatus. The storage apparatus is configured to store a computer program, the computer program includes program instructions, and the processor is configured to invoke the program instructions to execute various tasks (for example, execute various tasks of an operating system and an application).

For a specific implementation of the distance measurement apparatus, refer to the foregoing embodiments. The distance measurement apparatus is configured to send a target distance obtained through measurement to the processor, and the processor is configured to perform corresponding processing on the received target distance, to implement, for example, 3D photographing. The distance measurement apparatus in this embodiment may further send any data in a process of measuring the target distance to the processor.

The foregoing descriptions are merely embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A distance measurement apparatus, comprising:
   a time to digital converter;
   a pulse transmitter;
   a pulse receiver connected to the time to digital converter; and
   a controller separately connected to the time to digital converter, the pulse transmitter, and the pulse receiver; wherein
   the controller sequentially sends M transmit pulses in M transmit periods of a working period based on M transmit times, wherein one transmit pulse is in one transmit period and a transmit time of an $i^{th}$ of the M transmit pulses is obtained based on a start moment of a transmit period of the $i^{th}$ of the M transmit pulses and an $i^{th}$ of M latencies, wherein M is an integer greater than 1;

the pulse receiver is configured to receive N feedback pulses in the working period, wherein N is an integer greater than 1;

the time to digital converter is configured to obtain time of flight information corresponding to the N feedback pulses; and the controller is further configured to obtain a target time of flight that appears for a largest quantity of times in the time of flight information corresponding to the N feedback pulses, and obtain a target distance based on the target time of flight.

2. The distance measurement apparatus according to claim 1, wherein when the $i^{th}$ of the M transmit pulses is transmitted, time of flight information of the $i^{th}$ transmit pulse is a difference between a timing end moment of the time to digital converter and a timing start moment of the time to digital converter, wherein the timing end moment of the time to digital converter is a moment at which the pulse receiver receives a feedback pulse in the transmit period of the $i^{th}$ transmit pulse; and the timing start moment of the time to digital converter corresponds to the transmit time of the $i^{th}$ transmit pulse; or the timing start moment of the time to digital converter corresponds to the start moment of the transmit period of the $i^{th}$ transmit pulse.

3. The distance measurement apparatus according to claim 2, wherein when the timing start moment of the time to digital converter corresponds to the transmit time of the $i^{th}$ transmit pulse, time of flight of the N feedback pulses is the time of flight information corresponding to the N feedback pulses; or the distance measurement apparatus further comprises a latency compensator connected to the controller, and the latency compensator is configured to perform latency compensation on the time of flight information of the N feedback pulses based on the M latencies, to obtain the time of flight of the N feedback pulses when the timing start moment of the time to digital converter corresponds to the start moment of the transmit period of the $i^{th}$ transmit pulse.

4. The distance measurement apparatus according to claim 3, further comprising a memory connected to the controller, wherein the memory is configured to store the time of flight of the N feedback pulses.

5. The distance measurement apparatus according to claim 1, further comprising a latency generator connected to the controller, wherein the M latencies are obtained by the controller from the latency generator.

6. The distance measurement apparatus according to claim 1, wherein the M latencies are generated by the controller.

7. The distance measurement apparatus according to claim 1, wherein the M latencies are obtained through setting based on a true random number or a pseudo random number, or according to a preset rule.

8. A method of distance measurement, comprising:

sequentially sending, by an electronic device, M transmit pulses in M transmit periods of a working period based on M transmit times, wherein one transmit pulse is in one transmit period and a transmit time of an $i^{th}$ of the M transmit pulses is obtained based on a start moment of a transmit period of the $i^{th}$ of the M transmit pulses and an $i^{th}$ of M latencies and M is an integer greater than 1;

receiving, by the electronic device, N feedback pulses in the working period, wherein N is an integer greater than 1;

obtaining, by the electronic device, time of flight information corresponding to the N feedback pulses; and obtaining, by the electronic device, a target time of flight that appears for a largest quantity of times in the time of flight information corresponding to the N feedback pulses, and obtaining a target distance based on the target time of flight.

9. The method according to claim 8, wherein when the $i^{th}$ of the M transmit pulses is transmitted, time of flight information of the $i^{th}$ transmit pulse is a difference between a timing end moment of a timer and a timing start moment of the timer, wherein the timing end moment of the timer is a moment at which the electronic device receives a feedback pulse in the transmit period of the $i^{th}$ transmit pulse; and the timing start moment of the timer corresponds to the transmit time of the $i^{th}$ transmit pulse; or the timing start moment of the timer corresponds to the start moment of the transmit period of the $i^{th}$ transmit pulse.

10. The method according to claim 9, wherein when the timing start moment of the timer corresponds to the transmit time of the $i^{th}$ transmit pulse, time of flight of the N feedback pulses is the time of flight information corresponding to the N feedback pulses; or when the timing start moment of the timer corresponds to the start moment of the transmit period of the $i^{th}$ transmit pulse, the time of flight of the N feedback pulses is obtained through latency compensation.

11. The method according to claim 8, wherein the M latencies are obtained through setting based on a true random number or a pseudo random number, or according to a preset rule.

12. An electronic device, comprising:

a processor; and a distance measurement apparatus connected to the processor, the distance measurement apparatus comprising:

a time to digital converter;

a pulse transmitter;

a pulse receiver connected to the time to digital converter; and a controller separately connected to the time to digital converter, the pulse transmitter, and the pulse receiver; wherein the controller is configured to control the pulse transmitter to sequentially send M transmit pulses in M transmit periods of a working period based on M transmit times, wherein one transmit pulse is in one transmit period and a transmit time of an $i^{th}$ of the M transmit pulses is obtained based on a start moment of a transmit period of the $i^{th}$ of the M transmit pulses and an $i^{th}$ of M latencies, wherein M is an integer greater than 1;

the pulse receiver is configured to receive N feedback pulses in the working period, wherein N is an integer greater than 1;

the time to digital converter is configured to obtain time of flight information corresponding to the N feedback pulses; and the controller is further configured to obtain a target time of flight that appears for a largest quantity of times in the time of flight information corresponding to the N feedback pulses, and obtain a target distance based on the target time of flight;

wherein the distance measurement apparatus is configured to send the target distance to the processor, and the processor is configured to perform processing on the target distance.

13. The electronic device according to claim 12, wherein when the $i^{th}$ of the M transmit pulses is transmitted, time of flight information of the $i^{th}$ transmit pulse is a difference between a timing end moment of the time to digital converter and a timing start moment of the time to digital converter, wherein the timing end moment of the time to digital converter is a moment at which the pulse receiver receives a feedback pulse in the transmit period of the $i^{th}$ transmit pulse; and the timing start moment of the time to digital converter corresponds to the transmit time of the $i^{th}$ transmit pulse; or the timing start moment of the time to digital converter corresponds to the start moment of the transmit period of the $i^{th}$ transmit pulse.

14. The electronic device according to claim 13, wherein when the timing start moment of the time to digital converter corresponds to the transmit time of the $i^{th}$ transmit pulse, time of flight of the N feedback pulses is the time of flight information corresponding to the N feedback pulses; or the distance measurement apparatus further comprises a latency compensator connected to the controller, and the latency compensator is configured to perform latency compensation on the time of flight information of the N feedback pulses based on the M latencies, to obtain the time of flight of the N feedback pulses when the timing start moment of the time to digital converter corresponds to the start moment of the transmit period of the $i^{th}$ transmit pulse.

* * * * *